(12) United States Patent
Hewton

(10) Patent No.: US 11,825,922 B1
(45) Date of Patent: Nov. 28, 2023

(54) UMBRELLA FOR PETS

(71) Applicant: Alfred Hewton, Alexandria, VA (US)

(72) Inventor: Alfred Hewton, Alexandria, VA (US)

( * ) Notice: Subject to any disclaimer, the term of this patent is extended or adjusted under 35 U.S.C. 154(b) by 85 days.

(21) Appl. No.: 17/516,772

(22) Filed: Nov. 2, 2021

(51) Int. Cl.
*A45B 11/02* (2006.01)
*A01K 13/00* (2006.01)

(52) U.S. Cl.
CPC ............ *A45B 11/02* (2013.01); *A01K 13/006* (2013.01); *A45B 2200/1009* (2013.01)

(58) Field of Classification Search
CPC ............ A45B 11/02; A45B 2200/1009; A01K 13/006
See application file for complete search history.

(56) References Cited

U.S. PATENT DOCUMENTS

| | | | | |
|---|---|---|---|---|
| 692,641 | A | * | 2/1902 | Durnett, Sr. ............ A45B 11/02 224/190 |
| 1,888,909 | A | * | 11/1932 | Crosthwait ............ A45B 11/02 224/189 |
| 2,320,848 | A | * | 6/1943 | Hollie ..................... A45B 11/02 135/900 |
| 2,434,526 | A | * | 1/1948 | Thornton ............... A45B 11/02 224/189 |
| D391,392 | S | | 3/1998 | Adams |
| 5,918,611 | A | * | 7/1999 | Amato .................... A45B 11/02 135/96 |
| 7,021,246 | B2 | | 4/2006 | Seymour |
| 7,036,519 | B2 | | 5/2006 | Godshaw |
| 8,413,670 | B1 | | 4/2013 | Richardson, Jr. |
| 9,374,983 | B1 | | 6/2016 | Kuehr |
| 10,334,821 | B2 | | 7/2019 | Yun |
| D876,806 | S | | 3/2020 | Yi |
| 11,330,799 | B2 | * | 5/2022 | Albakri ............... A01K 13/006 |
| 2006/0027187 | A1 | | 2/2006 | Nicastro |
| 2008/0289586 | A1 | | 11/2008 | O'Connor |

FOREIGN PATENT DOCUMENTS

CA           2414679           5/2003

* cited by examiner

*Primary Examiner* — Noah Chandler Hawk

(57) ABSTRACT

The umbrella for pets comprises an umbrella, a front support, and a rear support. The umbrella may be adapted to shield a pet from weather. As non-limiting examples, the weather may comprise rain, snow, sleet, sunshine, or combinations thereof. The front support and the rear support may be adapted to removably couple to the pet and may hold the umbrella above the pet. The front support and the rear support may pivot up against a canopy of the umbrella for storage and transportation. In some embodiments, a left side panel and a right side panel may detachably couple to the sides of the umbrella to provide additional shielding from wind-blown weather. In some embodiments, a carrying bag may be uniquely adapted to transport the umbrella when not in use on the pet.

14 Claims, 6 Drawing Sheets

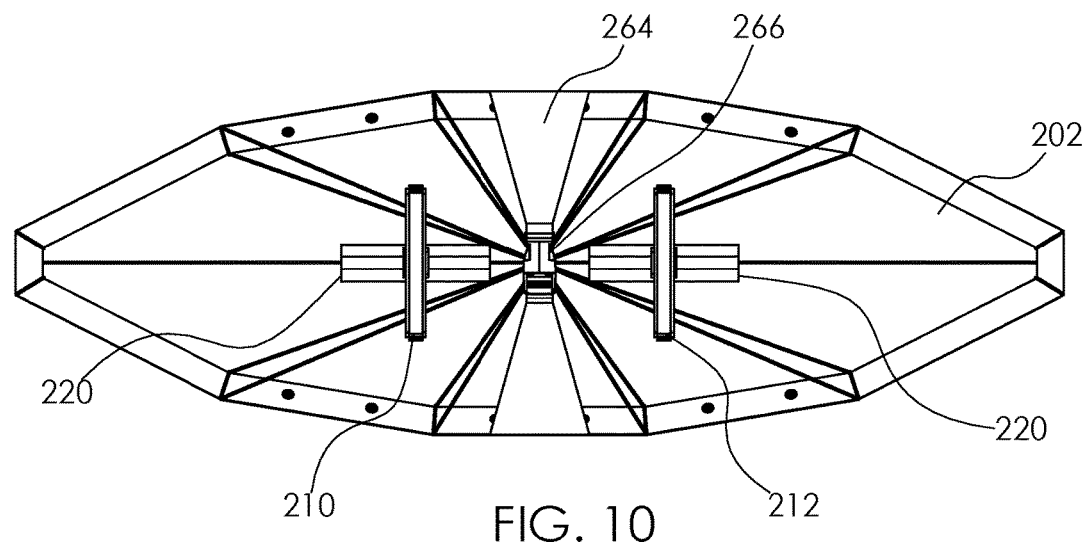
FIG. 10
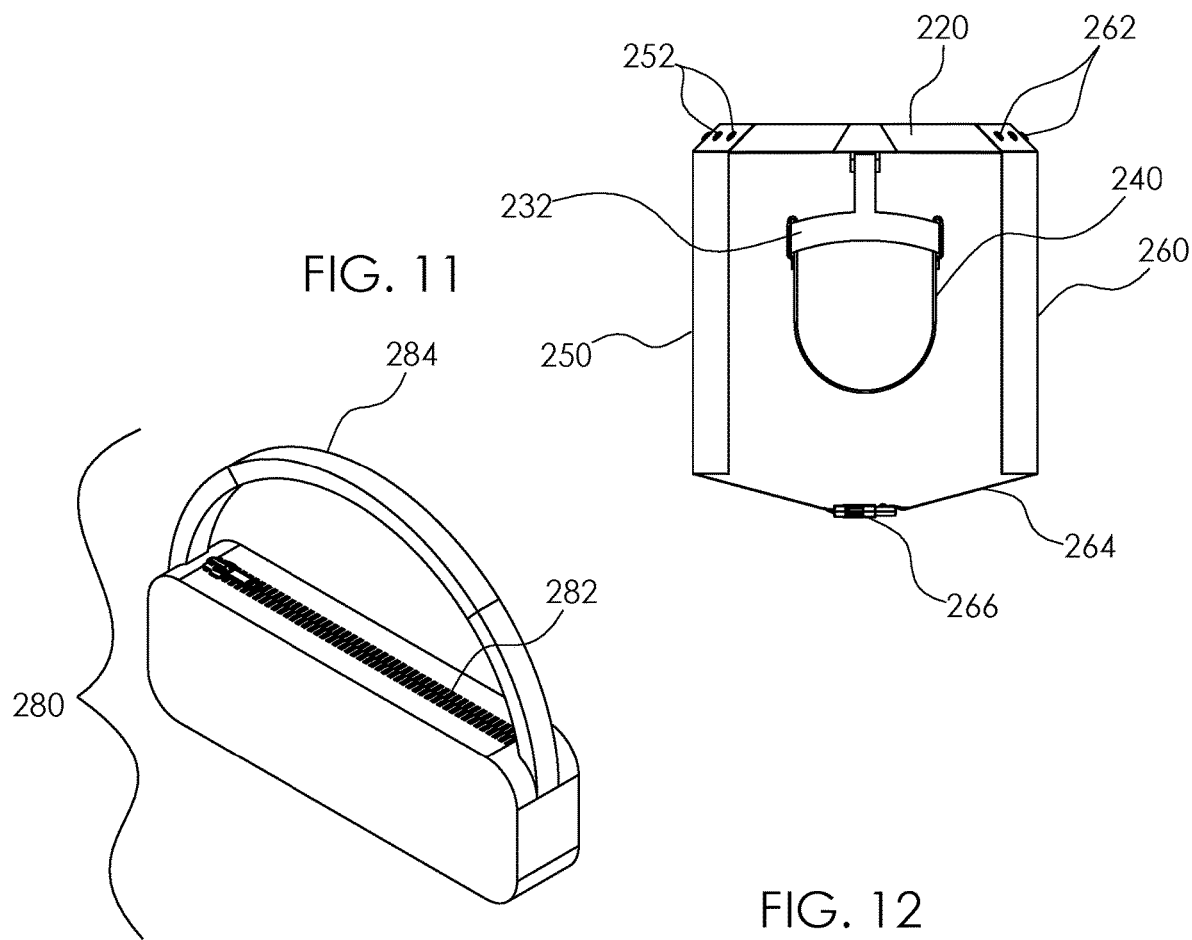
FIG. 11
FIG. 12

US 11,825,922 B1

UMBRELLA FOR PETS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet accessories, more specifically, an umbrella for pets.

SUMMARY OF INVENTION

The umbrella for pets.

The umbrella for pets 100 (hereinafter invention) may comprise an umbrella 200, a front support 210, and a rear support 212. The umbrella 200 may be adapted to shield a pet 900 from weather. As non-limiting examples, the weather may comprise rain, snow, sleet, sunshine, or combinations thereof. The front support 210 and the rear support 212 may be adapted to removably couple to the pet 900 and may hold the umbrella 200 above the pet 900. The front support 210 and the rear support 212 may pivot up against a canopy 202 of the umbrella 200 for storage and transportation. In some embodiments, a left side panel 250 and a right side panel 260 may detachably couple to the sides of the umbrella 200 to provide additional shielding from windblown weather. In some embodiments, a carrying bag 280 may be uniquely adapted to transport the umbrella 200 when not in use on the pet 900.

An object of the invention is to position an umbrella above a pet to provide shielding from the weather.

Another object of the invention is to provide an umbrella comprising a canopy that is extended horizontally by a plurality of ribs and a pair of supports that may be strapped to a pet to position the umbrella above the pet.

A further object of the invention is to provide a left panel and a right panel that may be hung from the sides of the umbrella to provide additional shielding form the weather.

Yet another object of the invention is to provide a carrying bag that is uniquely suited for storing and transporting the umbrella.

These together with additional objects, features and advantages of the umbrella for pets will be readily apparent to those of ordinary skill in the art upon reading the following detailed description of the presently preferred, but nonetheless illustrative, embodiments when taken in conjunction with the accompanying drawings.

In this respect, before explaining the current embodiments of the umbrella for pets in detail, it is to be understood that the umbrella for pets is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the umbrella for pets.

It is therefore important that the claims be regarded as including such equivalent construction insofar as they do not depart from the spirit and scope of the umbrella for pets. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 10 is a bottom view of an embodiment of the disclosure illustrating the left side panel and right side panel added to the umbrella.

FIG. 11 is a rear view of an embodiment of the disclosure illustrating the left side panel and right side panel added to the umbrella.

FIG. 12 is an isometric view of an embodiment of the disclosure illustrating the carrying bag.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
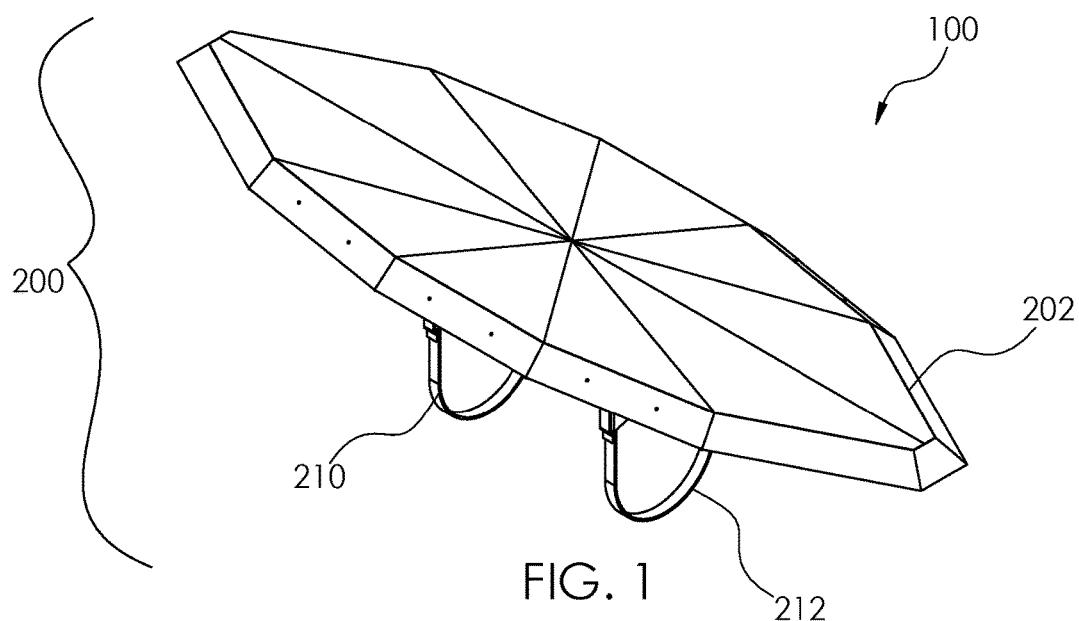
FIG. 1 is an isometric view of an embodiment of the disclosure.
Figure 2:
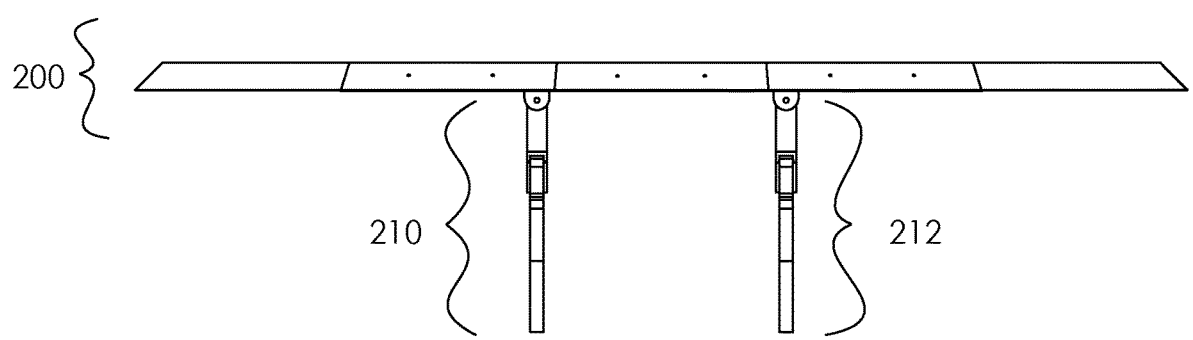
FIG. 2 is a side view of an embodiment of the disclosure.
Figure 3:
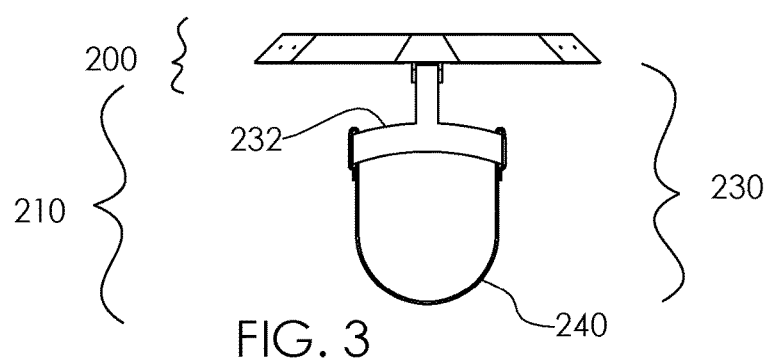
FIG. 3 is a front view of an embodiment of the disclosure.
Figure 4:
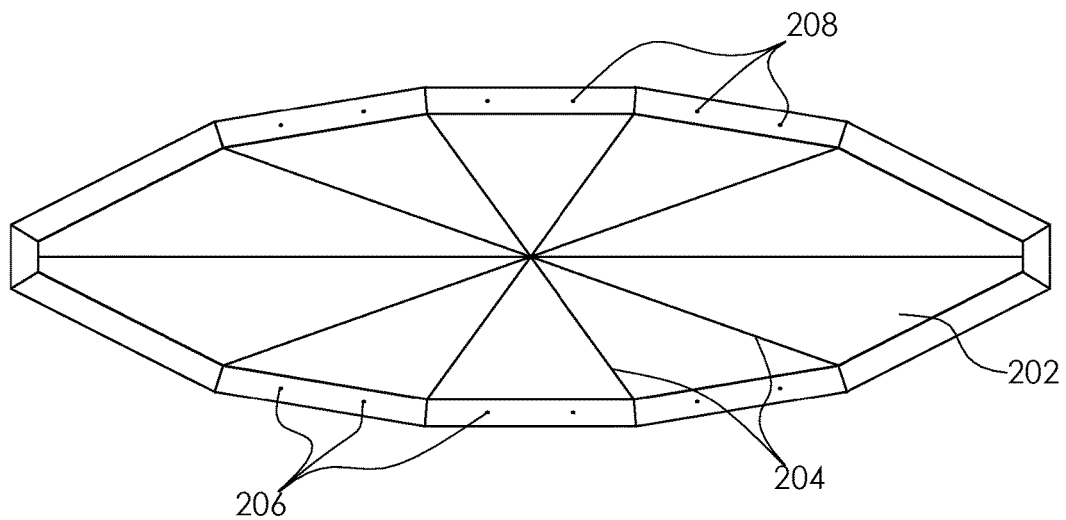
FIG. 4 is a top view of an embodiment of the disclosure.
Figure 5:
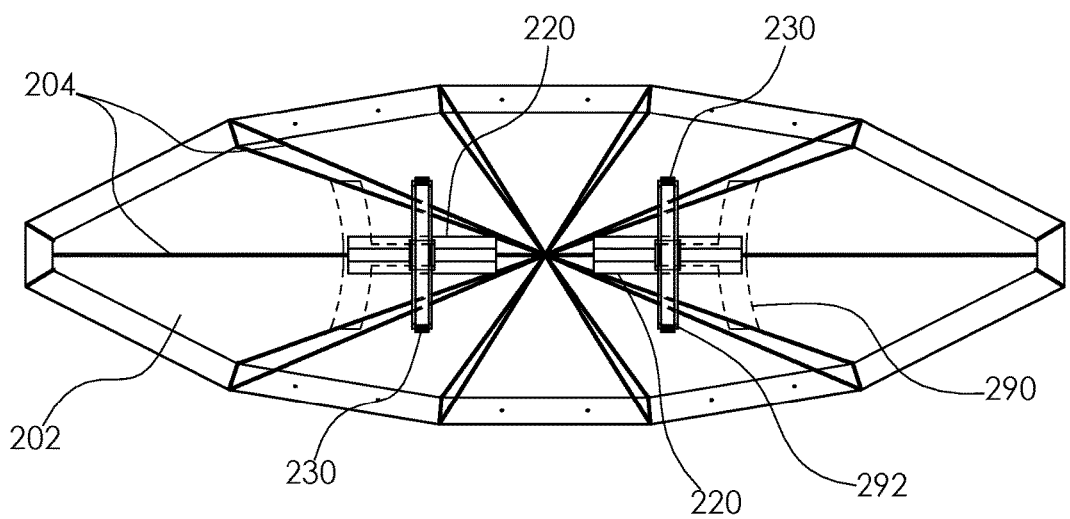
FIG. 5 is a bottom view of an embodiment of the disclosure.
Figure 6:
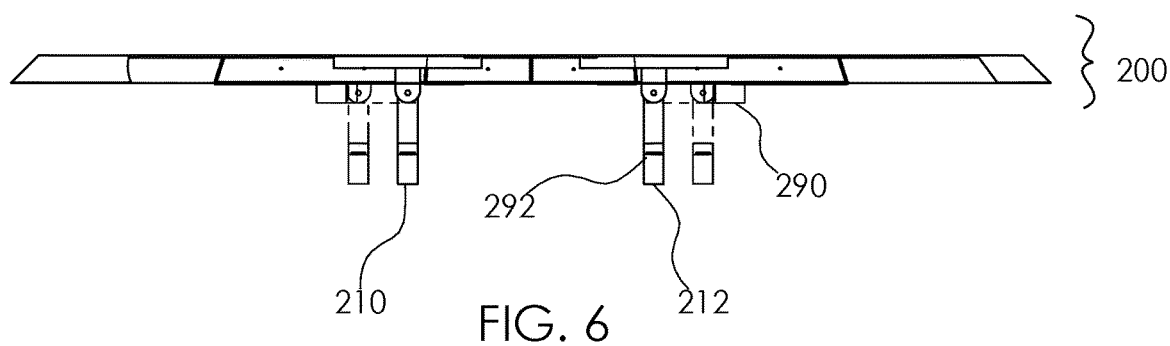
FIG. 6 is a side view of an embodiment of the disclosure with the understraps removed illustrating movement of the harnesses.
Figure 7:
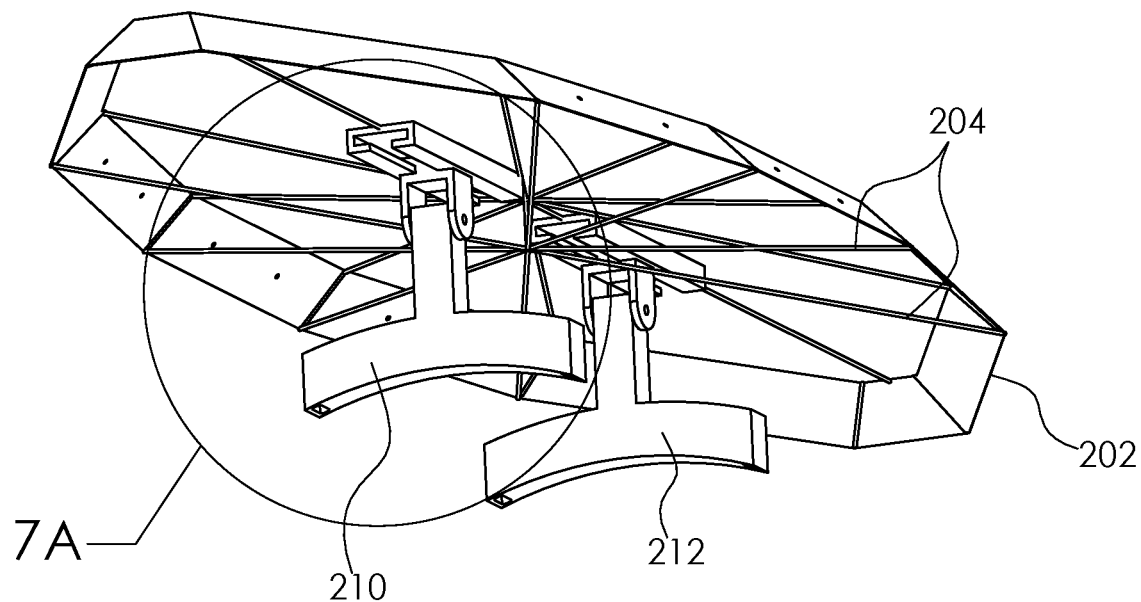
FIG. 7 is an isometric view of an embodiment of the disclosure illustrating the tracks and harnesses.
Figure 7A:
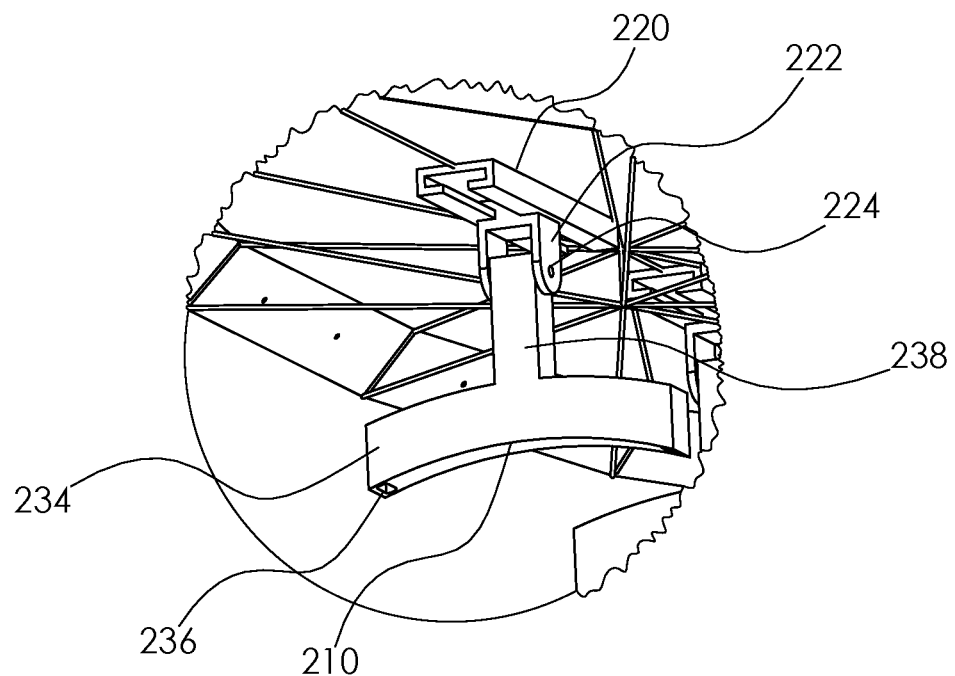
FIG. 7A is a detail view of an embodiment of the disclosure illustrating thew area designated as 7A in FIG. 7.
Figure 8:
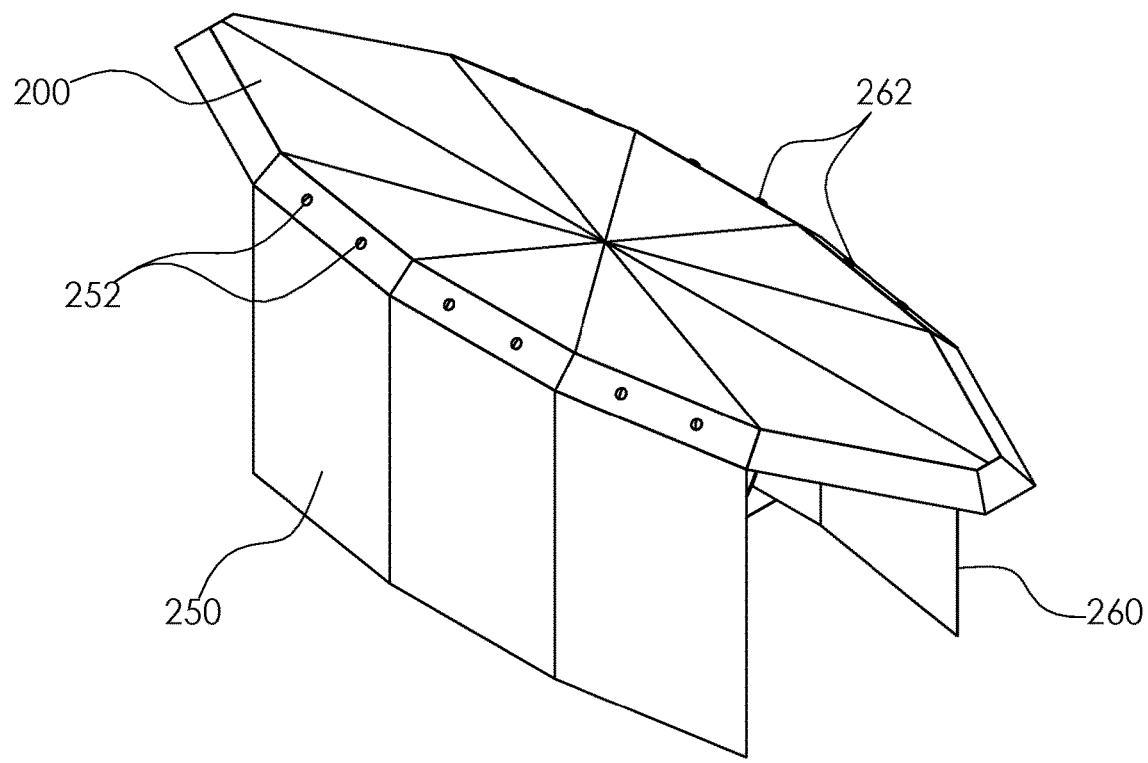
FIG. 8 is an isometric view of an embodiment of the disclosure illustrating the left side panel and right side panel added to the umbrella.
Figure 9:
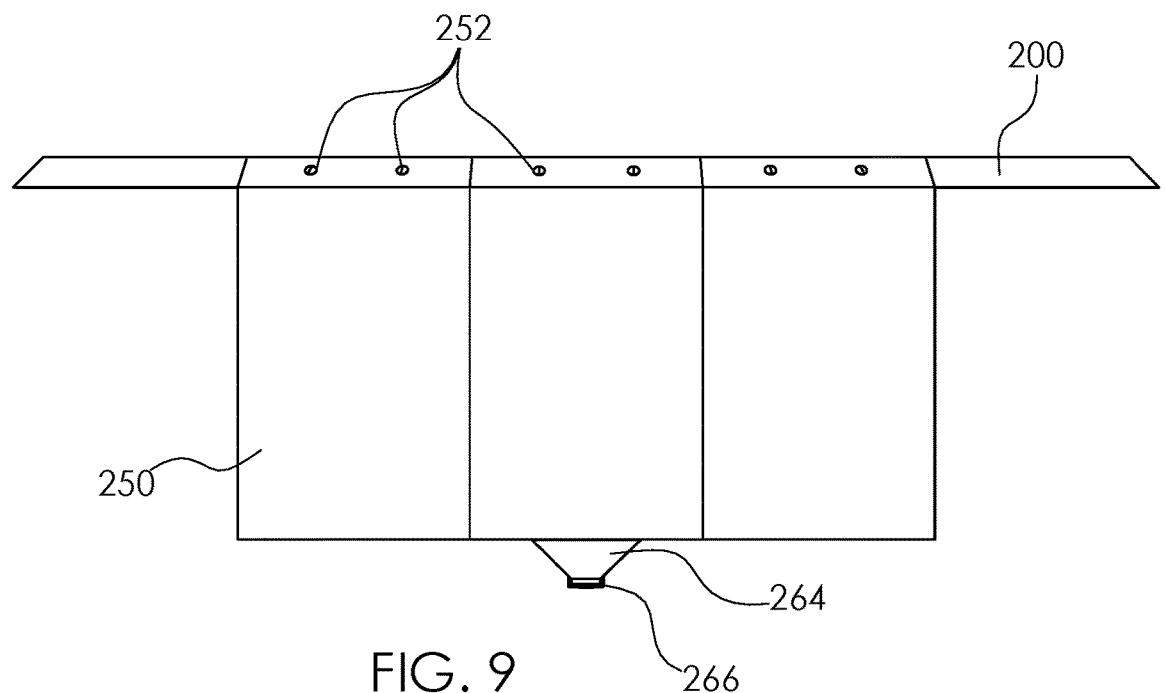
FIG. 9 is a side view of an embodiment of the disclosure illustrating the left side panel and right side panel added to the umbrella.
Figure 13:
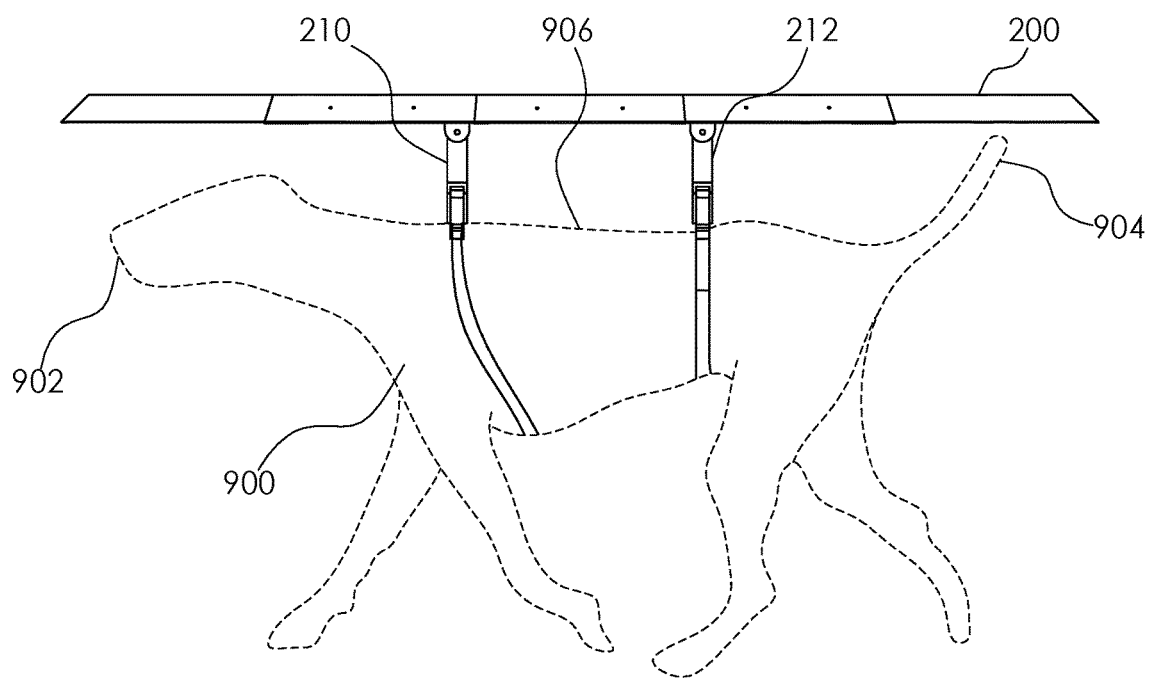
FIG. 13 is an in use side view of an embodiment of the disclosure.
Figure 14:
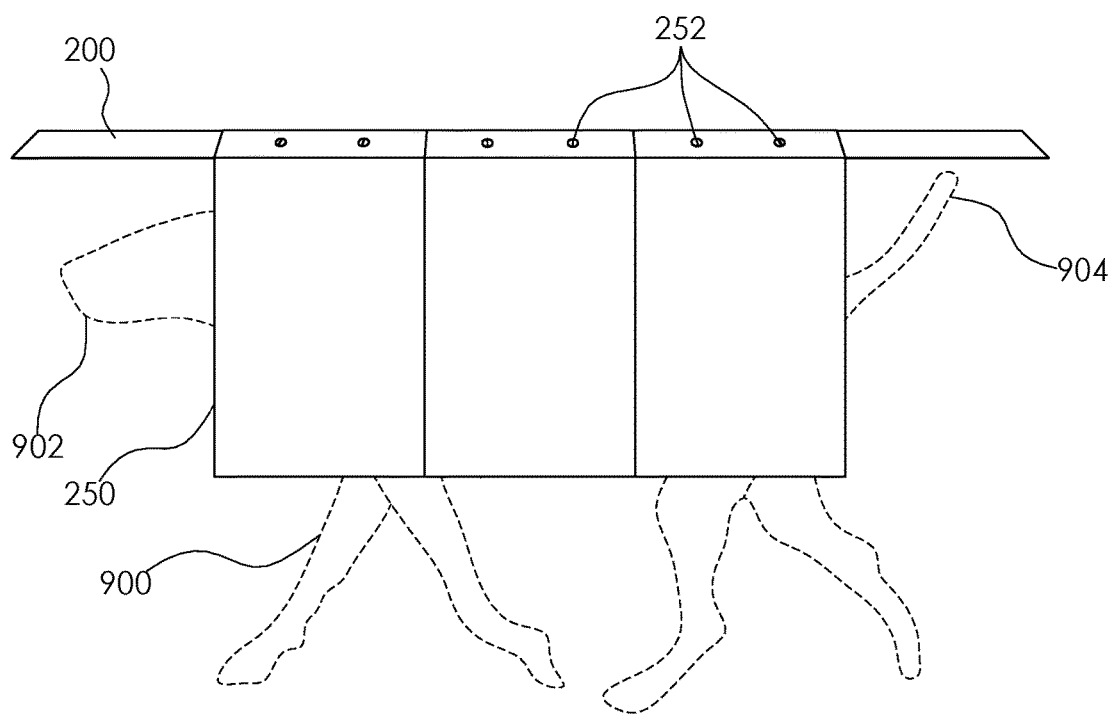
FIG. 14 is an in use side view of an embodiment of the disclosure illustrating side panels in place.

Detailed reference will now be made to a first potential embodiment of the disclosure, which is illustrated in FIGS. 1 through 14.

The umbrella for pets 100 (hereinafter invention) comprises an umbrella 200, a front support 210, and a rear support 212. The umbrella 200 may be adapted to shield a pet 900 from weather. As non-limiting examples, the weather may comprise rain, snow, sleet, sunshine, or combinations thereof. The front support 210 and the rear support 212 may be adapted to removably couple to the pet 900 and may hold the umbrella 200 above the pet 900. The front support 210 and the rear support 212 may pivot up against a canopy 202 of the umbrella 200 for storage and transportation. In some embodiments, a left side panel 250 and a right side panel 260 may detachably couple to the sides of the umbrella 200 to provide additional shielding from wind-blown weather. In some embodiments, a carrying bag 280 may be uniquely adapted to transporting the umbrella 200 when not in use on the pet 900.

The umbrella 200 may be a horizontally oriented covering that may be adapted to shield the pet 900 from the weather when positioned above the pet 900. The umbrella 200 may be oblong with the longer axis of the umbrella 200 oriented front-to-back and the shorter axis of the umbrella 200 oriented side-to-side. The umbrella 200 may be adapted to extend forward beyond a pet's nose 902 and rearward beyond a pet's tail 904.

The umbrella 200 may comprise the canopy 202 and a plurality of ribs 204. The canopy 202 may be a flexible cover that is extended horizontally by the plurality of ribs 204. The plurality of ribs 204 may be semi-rigid armatures that radiate horizontally from the center of the umbrella 200. The canopy 202 may be coupled to the distal ends of the plurality of ribs 204.

In some embodiments, the umbrella 200 may further comprise a plurality of left canopy fasteners 206 and a plurality of right canopy fasteners 208. The plurality of left canopy fasteners 206 and the plurality of right canopy fasteners 208 may be coupled to the sides of the canopy 202 such that the left side panel 250 and the right side panel 260 may detachably couple to the umbrella 200 via the plurality of left canopy fasteners 206 and the plurality of right canopy fasteners 208.

The front support 210 and the rear support 212 may be coupled to the underside of the umbrella 200 and may be adapted to position the umbrella 200 above the pet 900. The front support 210 may be coupled along a longitudinal midline of the umbrella 200 and may be located on the front half of the umbrella 200. The rear support 212 may be coupled along the longitudinal midline of the umbrella 200 and may be located on the rear half of the umbrella 200.

An individual support selected from the front support 210 and the rear support 212 may comprise a track 220, a carrier 222, a hinge 224, and a harness 230. The individual support may pivot between a storage position 290 and a use position 292. In the storage position 290, the individual support may be oriented to be parallel to the umbrella 200. In the use position 292, the individual support may be oriented to extend downwards perpendicularly from the umbrella 200.

The track 220 may be a longitudinally oriented channel that may retain the carrier 222 and may guide movements of the carrier 222. The carrier 222 may be adapted to slide towards the front or rear of the umbrella 200 in order to adjust the size and/or position of the umbrella 200 relative to the pet 900.

The carrier 222 may be a sliding armature that moves within the track 220. The carrier 222 may be coupled to the harness 230 via the hinge 224. Pivoting of the harness 230 at the hinge 224 may result in the individual support moving between the storage position 290 and the use position 292.

The harness 230 may be adapted to removably couple to the pet 900. The harness 230 may comprise a saddle 232 and an understrap 240. The saddle 232 may be adapted to rest on a pet's back 906. The understrap 240 may be adapted to wrap around the underside of the pet 900.

The saddle 232 may be a rigid armature in the shape of an inverted T. The saddle 232 may comprise a cross-piece 234 and an upright 238. The cross-piece 234 may extend from side-to-side at the bottom of the individual support. The cross-piece 234 may comprise a curve that is adapted to match the side-to-side contour of the pet 900. The bottom of the upright 238 may be coupled to the center of the cross-piece 234. The top of the upright 238 may be coupled to the hinge 224.

The understrap 240 may be a flexible strap that detachably couples to the opposing ends of the cross-piece 234 via a pair of strap apertures 236. The understrap 240 may be adapted to pass under the pet 900 to retain the individual support to the pet 900. The understrap 240 may be adapted to adjust to the size of the pet 900 by changing the length of the understrap 240 that passes through the pair of strap apertures 236. As a non-limiting example, the ends of the understrap 240 may comprise hook and loop fasteners such that the understrap 240 may pass through the pair of strap apertures 236 and couple onto the understrap 240 where the hook and loop fasteners may retain the ends of the understrap 240.

In some embodiments, the invention 100 may comprise the left side panel 250 and the right side panel 260. The left side panel 250 and the right side panel 260 may detachably couple to the sides of the umbrella 200 to provide additional shielding from wind-blown weather. The left side panel 250 may comprise a plurality of left side fasteners 252 and the right side panel 260 may comprise a plurality of right side fasteners 262. As non-limiting examples, the plurality of left canopy fasteners 206 and the plurality of right canopy fasteners 208 may be female snap fasteners and the plurality of left side fasteners 252 and the plurality of right side fasteners 262 may be male snap fasteners.

In some embodiments, a side panel strap 264 may detachably couple the bottom center of the left side panel 250 to the bottom center of the right side panel 260 to stabilize the left side panel 250 and the right side panel 260 in the wind. The side panel strap 264 may be adapted to pass beneath the pet 900. The side panel strap 264 may comprise a side panel release buckle 266 that may be operable to couple and decouple the side panel strap 264 for donning and removal.

In some embodiments, the canopy 202, the left side panel 250, the right side panel 260 or combinations thereof may be made of a water resistant fabric.

Embodiments of the invention 100 may comprise various sizes. The dimensions of the invention 100 may be adapted to match the size of the pet 900. As non-limiting examples, the longitudinal length of the umbrella 200, the lateral width of the umbrella 200, the length of the understrap 240, the size and degree of curvature of the cross-piece 234 of the saddle 232, or combinations thereof may be adapted to correspond to the size of the pet 900.

The carrying bag 280 may be adapted to hold the umbrella 200 during transportation and/or storage. The carrying bag 280 may be larger in all dimensions than the umbrella 200 when the front support 210 and the rear support 212 are in the storage position 290. The carrying bag 280 may comprise a zipper 282 on one side such that the carrying bag 280 may be opened to insert and to remove the umbrella 200. The carrying bag 280 may further comprise a carrying strap 284. The carrying strap 284 may be adapted to be grasped by a user in order to carry the carrying bag 280.

In use, the front support 210 and the rear support 212 may be moved to the use position 292 by pivoting the harness 230 down on each support. The spacing between the front support 210 and the rear support 212 may be adjusted, if necessary, by sliding the front support 210, the rear support 212, or both along the tracks 220. The umbrella 200 may be held above the pet 900 with the front support 210 and the rear support 212 resting on the pet's back 906. Each of the individual supports selected from the front support 210 and the rear support 212 may be coupled to the pet 900 by passing the understrap 240 under the pet 900 and fastening both ends of the understrap 240 to the opposing ends of the cross-piece 234 of the saddle 232. With the canopy 202 thus positioned above the pet 900, the pet 900 may be shielded from the weather.

The left side panel 250 and the right side panel 260 may be coupled to the sides of the umbrella 200 by coupling the plurality of left side fasteners 252 to the plurality of left canopy fasteners 206 and by coupling the plurality of right side fasteners 262 to the plurality of right canopy fasteners 208. The side panel strap 264 may be coupled under the pet 900 using the side panel release buckle 266 to prevent the left side panel 250 and the right side panel 260 from flapping excessively in the wind.

When not in use, the front support 210 and the rear support 212 may be moved to the storage position 290 by pivoting the front support 210 and the rear support 212 up and towards the center of the umbrella 200, the umbrella 200 may be placed into the carrying bag 280, and the zipper 282 may be zipped. The umbrella 200 may be stored and/or transported within the carrying bag 280.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, the word "correspond" may indicate that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, "flexible" may refer to an object or material which will deform when a force is applied to it, which will not return to its original shape when the deforming force is removed, and which may not retain the deformed shape caused by the deforming force.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, a "hook and loop fastener" may be a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. The hook surface may sometime be referred to as a hard side fastener and the loop surface may sometimes be referred to as a soft side fastener.

As used in this disclosure, "horizontal" may be a directional term that refers to a direction that is perpendicular to the local force of gravity. Unless specifically noted in this disclosure, the horizontal direction is always perpendicular to the vertical direction.

As used herein, the words "invert", "inverted", or "inversion" may refer to an object that has been turned inside out or upside down or to the act of turning an object inside out or upside down.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used herein, "oblong" may refer to an object that is elongated.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, "resilient" or "semi-rigid" may refer to an object or material which will deform when a force is applied to it and which will return to its original shape when the deforming force is removed.

As used in this disclosure, a "snap" may be a fastener that comprises a male component and a female component. The snap is engaged by pressing the male component into the female component.

As used in this disclosure a "strap" may be a strip of leather, cloth, nylon, plastic, thin metal, rubber, or other flexible material, that is used to fasten, secure, carry, or hold onto something. A strap is sometimes used in conjunction with a buckle or other types of fasteners.

As used in this disclosure, a "track" may be a device that is used to control the path of motion of an object in at least one dimension.

As used herein, "water resistant" may refer to an object that is not harmed by incidental exposure to water but may be harmed if totally submerged. As non-limiting examples, incidental exposure to water may include exposure to raindrops, dew, and splashes from puddles.

As used in this disclosure, a "zipper" may be a fastening device comprising two flexible strips with interlocking components that are opened and closed by pulling a slide along the two flexible strips.

With respect to the above description, it is to be realized that the optimum dimensional relationship for the various components of the invention described above and in FIGS. 1 through 14, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An umbrella for pets comprising:
an umbrella, a front support, and a rear support;
wherein the umbrella is adapted to shield a pet from weather;
wherein the front support and the rear support are adapted to removably couple to the pet and hold the umbrella above the pet;
wherein the front support and the rear support pivot up against a canopy of the umbrella for storage and transportation;
wherein the front support and the rear support are coupled to an underside of the umbrella and are adapted to position the umbrella above the pet;
wherein the front support is coupled along a longitudinal midline of the umbrella and is located on a front half of the umbrella;
wherein the rear support is coupled along the longitudinal midline of the umbrella and is located on a rear half of the umbrella;
wherein the umbrella is a horizontally oriented covering that is adapted to shield the pet from the weather when positioned above the pet;
wherein the umbrella is oblong with the longer axis of the umbrella oriented front-to-back and the shorter axis of the umbrella oriented side-to-side;
wherein the umbrella is adapted to extend forward beyond a pet's nose and rearward beyond a pet's tail;
wherein the umbrella comprises the canopy and a plurality of ribs;
wherein the canopy is a flexible cover that is extended horizontally by the plurality of ribs;
wherein the plurality of ribs are semi-rigid armatures that radiate horizontally from the center of the umbrella;
wherein the canopy is coupled to the distal ends of the plurality of ribs;
wherein the umbrella further comprises a plurality of left canopy fasteners and a plurality of right canopy fasteners;
wherein the plurality of left canopy fasteners and the plurality of right canopy fasteners are coupled to the sides of the canopy such that a left side panel and a right side panel detachably couple to the umbrella via the plurality of left canopy fasteners and the plurality of right canopy fasteners;
wherein an individual support selected from the front support and the rear support comprises a track, a carrier, a hinge, and a harness;
wherein the individual support pivots between a storage position and a use position;
wherein in the storage position, the individual support is oriented to be parallel to the umbrella;
wherein in the use position, the individual support is oriented to extend downwards perpendicularly from the umbrella.

2. The umbrella for pets according to claim 1
wherein the track is a longitudinally oriented channel that retains the carrier and guides movements of the carrier;
wherein the carrier is adapted to slide towards the front or rear of the umbrella in order to adjust the size and/or position of the umbrella relative to the pet.

3. The umbrella for pets according to claim 2
wherein the carrier is a sliding armature that moves within the track;
wherein the carrier is coupled to the harness via the hinge;
wherein pivoting of the harness at the hinge results in the individual support moving between the storage position and the use position.

4. The umbrella for pets according to claim 3
wherein the harness is adapted to removably couple to the pet;
wherein the harness comprises a saddle and an understrap;
wherein the saddle is adapted to rest on a pet's back;
wherein the understrap is adapted to wrap around the underside of the pet.

5. The umbrella for pets according to claim 4
wherein the saddle is a rigid armature in the shape of an inverted T;
wherein the saddle comprises a cross-piece and an upright;
wherein the cross-piece extends from side-to-side at the bottom of the individual support;
wherein the cross-piece comprises a curve that is adapted to match the side-to-side contour of the pet;
wherein the bottom of the upright is coupled to the center of the cross-piece;
wherein the top of the upright is coupled to the hinge.

6. The umbrella for pets according to claim 5
wherein the understrap is a flexible strap that detachably couples to the opposing ends of the cross-piece via a pair of strap apertures;
wherein the understrap is adapted to pass under the pet to retain the individual support to the pet;

wherein the understrap is adapted to adjust to the size of the pet by changing the length of the understrap that passes through the pair of strap apertures.

7. The umbrella for pets according to claim 6
wherein the ends of the understrap comprises hook and loop fasteners such that the understrap passes through the pair of strap apertures and couples onto the understrap;
wherein the hook and loop fasteners retain the ends of the understrap.

8. The umbrella for pets according to claim 6
wherein the umbrella for pets comprises the left side panel and the right side panel;
wherein the left side panel and the right side panel detachably couple to the sides of the umbrella to provide additional shielding from wind-blown weather;
wherein the left side panel comprises a plurality of left side fasteners and the right side panel comprises a plurality of right side fasteners.

9. The umbrella for pets according to claim 8
wherein the plurality of left canopy fasteners and the plurality of right canopy fasteners are female snap fasteners and the plurality of left side fasteners and the plurality of right side fasteners are male snap fasteners.

10. The umbrella for pets according to claim 9
wherein a side panel strap detachably couples the bottom center of the left side panel to the bottom center of the right side panel to stabilize the left side panel and the right side panel;
wherein the side panel strap is adapted to pass beneath the pet;
wherein the side panel strap comprises a side panel release buckle that is operable to couple and decouple the side panel strap for donning and removal.

11. The umbrella for pets according to claim 10
wherein the canopy, the left side panel, the right side panel or combinations thereof are made of a water resistant fabric.

12. The umbrella for pets according to claim 11
wherein the dimensions of the umbrella for pets are adapted to match the size of the pet.

13. The umbrella for pets according to claim 12
wherein the longitudinal length of the umbrella, the lateral width of the umbrella, the length of the understrap, the size and degree of curvature of the cross-piece of the saddle, or combinations thereof are adapted to correspond to the size of the pet.

14. The umbrella for pets according to claim 12
wherein a carrying bag is adapted to hold the umbrella during transportation and/or storage;
wherein the carrying bag is larger in all dimensions than the umbrella when the front support and the rear support are in the storage position;
wherein the carrying bag comprises a zipper on one side such that the carrying bag is opened to insert and to remove the umbrella;
wherein the carrying bag further comprises a carrying strap;
wherein the carrying strap is adapted to be grasped by a user in order to carry the carrying bag.

* * * * *